United States Patent
Lowry et al.

(10) Patent No.: US 7,933,097 B1
(45) Date of Patent: Apr. 26, 2011

(54) DISK DRIVE HEAD SUSPENSION WITH DAMPER HINGE

(75) Inventors: Mark G. Lowry, Minneapolis, MN (US); Jacob D. Bjorstrom, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 863 days.

(21) Appl. No.: 11/837,358

(22) Filed: Aug. 10, 2007

(51) Int. Cl.
G11B 5/48 (2006.01)
G11B 21/21 (2006.01)
G11B 21/16 (2006.01)

(52) U.S. Cl. .................. 360/244.8; 360/244.3
(58) Field of Classification Search ............... 360/244.2, 360/244.3, 244.5, 244.8, 244.9
See application file for complete search history.

(56) References Cited

U.S. PATENT DOCUMENTS

| | | | |
|---|---|---|---|
| 4,760,478 A * | 7/1988 | Pal et al. ............... | 360/244.3 |
| 5,187,625 A * | 2/1993 | Blaeser et al. .......... | 360/244.3 |
| 5,650,894 A * | 7/1997 | Ikeda ..................... | 360/244.3 |
| 5,801,905 A | 9/1998 | Schirle et al. | |
| 6,005,750 A | 12/1999 | Willard et al. | |
| 6,151,198 A | 11/2000 | Prater et al. | |
| 6,212,043 B1 * | 4/2001 | Nakamura et al. ...... | 360/244.3 |
| 6,271,996 B1 * | 8/2001 | Houk et al. ............. | 360/244.9 |
| 6,498,704 B1 | 12/2002 | Chessman et al. | |
| 6,549,376 B1 | 4/2003 | Scura et al. | |
| 6,697,225 B2 | 2/2004 | Wittig et al. | |
| 6,704,164 B1 * | 3/2004 | Hiraoka .................. | 360/244.8 |
| 6,731,466 B2 | 5/2004 | Arya | |
| 6,735,050 B2 * | 5/2004 | Takagi et al. ........... | 360/244.9 |
| 7,054,109 B2 * | 5/2006 | Erpelding .............. | 360/244.2 |
| 7,209,325 B2 * | 4/2007 | Boutaghou et al. ..... | 360/244.2 |
| 7,420,778 B2 * | 9/2008 | Sassine et al. .......... | 360/244.9 |
| 7,571,535 B2 * | 8/2009 | Wright .................... | 29/603.03 |
| 7,688,551 B2 * | 3/2010 | Kido et al. .............. | 360/244.9 |
| 2003/0202284 A1 * | 10/2003 | Arya ...................... | 360/244.3 |
| 2004/0061975 A1 * | 4/2004 | Boutaghou et al. ..... | 360/244.8 |
| 2004/0246625 A1 * | 12/2004 | Tsuchida et al. ........ | 360/244.2 |
| 2005/0135013 A1 * | 6/2005 | Sassine et al. .......... | 360/244.9 |
| 2007/0019331 A1 * | 1/2007 | Kido et al. .............. | 360/244.3 |

FOREIGN PATENT DOCUMENTS

EP 847043 A1 * 6/1998
JP 11185415 A * 7/1999

OTHER PUBLICATIONS

English-machine translation of JP 11-185415 A, Yamamoto et al., published on Jul. 9, 1999.*

* cited by examiner

Primary Examiner — William J Klimowicz
(74) Attorney, Agent, or Firm — Faegre & Benson LLP

(57) ABSTRACT

A disk drive head suspension includes a load beam, a flexure for carrying a magnetic head slider, a base mounting structure for coupling the head suspension to a disk drive actuation system, a hinge, and a damping material. The load beam includes a proximal end portion and a distal end portion. The flexure is attached to and supported by the load beam. The hinge is attached to the base mounting structure and to the load beam and includes a constraint layer portion extending toward the distal end portion of the load beam. The damping material is located between and in contact with the constraint layer portion of the hinge and the load beam for damping resonance vibrations in the head suspension.

20 Claims, 4 Drawing Sheets

DISK DRIVE HEAD SUSPENSION WITH DAMPER HINGE

TECHNICAL FIELD

The present invention relates generally to head suspension assemblies for supporting read/write heads over recording media. In particular, the present invention includes a disk drive head suspension including damping structures.

BACKGROUND

Disk drive head suspensions are known and commonly used in magnetic disk drives or other dynamic storage devices. Conventional disk drive head suspensions can typically include a generally rigid base plate for attaching the head suspension to a disk drive actuation system, a load beam coupled to the base plate, and a flexure supported by the load beam for mounting a magnetic read/write head slider. The flexure allows pitch and roll motion of the head slider as it moves over the data tracks of the disk drive storage media, e.g., a rigid magnetic disk, which spins beneath the head slider.

Resonance vibration of the disk drive components, including the magnetic read/write head slider, is undesirable. Damping structures have been incorporated into the head suspension design to reduce resonance vibration. There is, however, a continuing need for improved disk drive head suspensions exhibiting reduced resonance vibration, which can be efficiently and economically manufactured.

SUMMARY

The present invention is a disk drive head suspension having an improved damping structure for damping resonance mode vibration. In one embodiment, the head suspension comprises a load beam, a flexure for carrying a magnetic head slider, a base mounting structure for coupling the head suspension to a disk drive actuation system, a hinge, and a damping material. The load beam includes a proximal end portion and a distal end portion. The flexure is attached to and supported by the load beam. The hinge is attached to the base mounting structure and to the load beam and includes a constraint layer portion extending toward the distal end portion of the load beam. The damping material is located between and in contact with the constraint layer portion of the hinge and the load beam for damping resonance vibrations of the head suspension.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
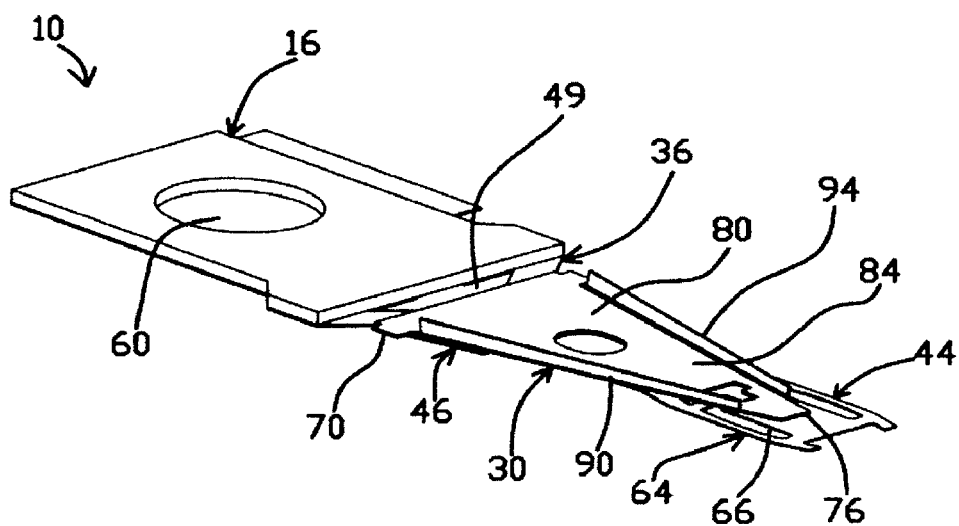
FIG. 1 is a perspective view of a disk drive head suspension according to one embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a perspective view of a head suspension 10 according to one embodiment of the present invention. As shown, the head suspension 10 includes a base mounting structure 16, a load beam 30, a hinge 36, a flexure 44, and a damper 46. The hinge 36 is attached to the base mounting structure 16 and the load beam 30, which is separated from the base mounting structure 16 by a gap 49. Additionally, the flexure 44 is attached to and supported by the load beam 30. As will be explained in detail below, the novel damper 46 of the various embodiments of the present invention utilizes a portion of the hinge 36 as a constraint layer and reduces first and second torsion mode vibration as well as sway mode vibration as compared to head suspensions with conventional damping structures.

The base mounting structure 16 provides a relatively stiff and rigid structure for securely mounting the head suspension 10 to the disk drive actuation system. In the illustrated embodiment, the base mounting structure 16 is a conventional base plate, and includes an opening 60 configured to mate with a boss on an E-block or similar structure of a disk drive actuation system (not shown) for mounting the head suspension 10 thereto as is known in the art. In various other embodiments, a separate base plate need not be included, and the base mounting structure 16 can be an arm or any other generally rigid structure, whether now known or later developed, for attaching the head suspension 10 to the disk drive actuation system.

The flexure 44 operates to support and electrically couple a magnetic head slider (not shown) to disk drive electrical circuitry, and can be of any suitable design and construction. In the illustrated embodiment, the flexure 44 has a distal gimbal region 64 including a tongue 66 to which the head slider can be attached, and can include one or more conductive traces (not shown) for electrically coupling the head slider to the disk drive electrical circuitry. The gimbal region 64 is designed to be resiliently moveable with respect to the remainder of the flexure 44 in response to the aerodynamic forces generated as the magnetic disk rotates relative to the head slider.

Figure 2:
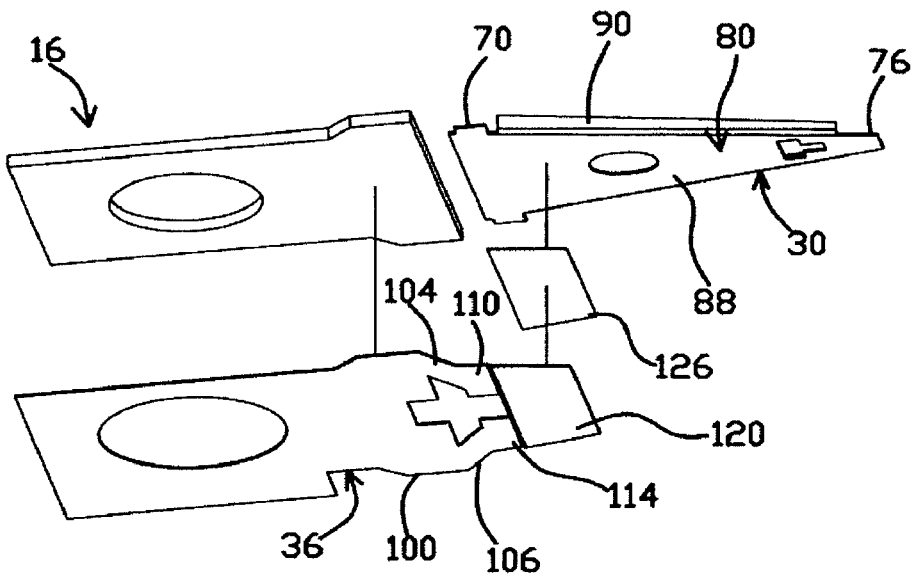
FIG. 2 is an exploded perspective view of a portion of the head suspension of FIG. 1.
Figure 3:
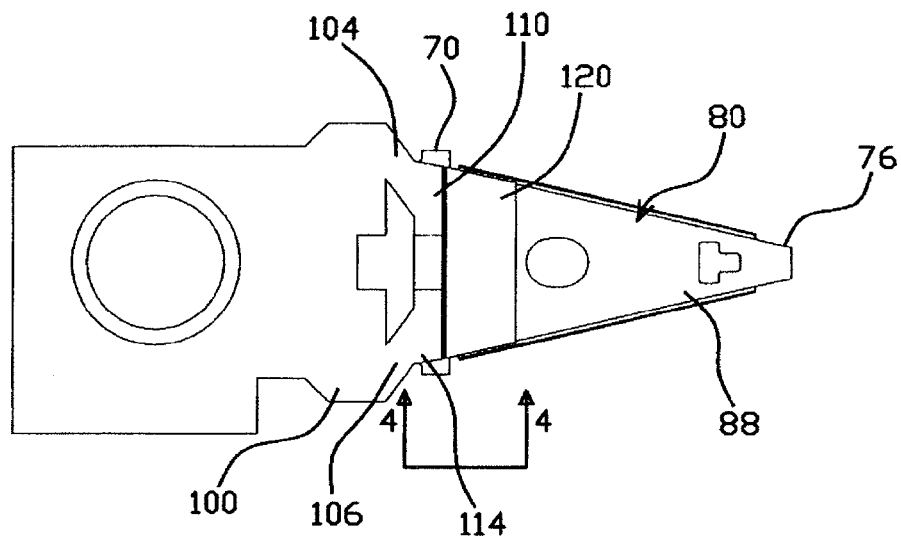
FIG. 3 is a plan view of a portion of the head suspension of FIG. 1.

FIGS. 2 and 3 are perspective exploded and plan views, respectively, of a portion of the head suspension 10, showing the base mounting structure 16, the load beam 30, the hinge 36, and the damper 46. For illustration purposes, the flexure 44 is not shown in FIGS. 2 and 3. As shown, the load beam 30 includes a proximal end portion 70 and a distal end portion 76. As further shown, the load beam 30 has a generally planar portion 80 having a first side 84 and a second side 88 opposite the first side 84, and a pair of longitudinal edge rails 90, 94 extending generally orthogonally from the first side 84. The edge rails 90, 94 operate, in part, to enhance the stiffness of the load beam 30. In the illustrated embodiment, the load beam 30 is a monolithic structure, and the planar portion 80 and the edge rails 90, 94 are formed from a single piece of material. In one embodiment, the load beam 30 may be a laminate structure including layers of metal and a dielectric material, e.g., polyimide, and the edge rails 90, 94 are formed by a photolithography process. In other embodiments, the load beam 30 may be generally planar and therefore lack the edge rails 90, 94. Still other suitable load beam configurations will be apparent to those skilled in the art based on the foregoing.

As shown, the hinge 36 includes a proximal mounting portion 100, a pair of hinge arms 104, 106 terminating in respective load beam mounting portions 110, 114, and a constraint layer portion 120 extending distally from the load beam mounting portions 110, 114. The hinge proximal mounting portion 100 is attached to the base mounting structure 16, the load beam mounting portions 110, 114, are attached to the second side 88 of the load beam 30, and the hinge arms 104, 106 extend distally from the hinge proximal mounting portion 100 across the gap 49 to the load beam mounting portions 110, 114, respectively. The hinge 36 thus operates, in part, to mechanically couple the load beam 30 to the base mounting structure 16, while imparting a desired degree of flexibility to the head suspension 10. Because in the illustrated embodiment, the hinge 36 and the load beam 30 are separately provided structures, the load beam 30 is indirectly coupled to the base mounting structure 16 via the hinge 36. In other embodiments, the hinge 36 may be integrally formed with the load beam 30 (i.e., the load beam 30 and the hinge 36 form a monolithic structure), such that the load beam 30 is directly coupled to the base mounting structure 16 via the hinge portion of the load beam 30.

In other embodiments, the hinge 36 may take on other configurations. For example, in other embodiments, the hinge 36 may be a single, monolithic structure without separate hinge arms. In other embodiments, the load beam mounting portions 110, 114 may form a single structure extending transversely between the hinge arms 104, 106. Still other hinge configurations will become apparent to those skilled in the art based on the foregoing.

The constraint layer portion 120 extends from the load beam mounting portions 110, 114 toward the distal end 76 of the load beam 30. In the illustrated embodiment, the constraint layer portion 120 has a shape generally conforming to the tapered shape of the adjacent portion of the load beam 30. In one embodiment, the constraint layer portion 120 is integrally formed with the other portions of the hinge 36, i.e., such that the hinge 36 is a monolithic structure. In other embodiments, the constraint layer portion 120 may be formed separately from the hinge arms 104, 106 and later attached by a suitable joining method, e.g., welding. In the latter embodiments, the constraint layer portion 120 may be made from the same material as the other portions of the hinge 36. In other embodiments, the constraint layer portion 120 and the hinge arms 104, 106 may be made from different materials. In still other embodiments, the constraint layer portion 120 may be detached from the load beam mounting portions 110, 114, e.g., by laser cutting or an etching process, after the hinge 36 is attached to the load beam 30 and the damper 46 is formed.

The base mounting structure 16, the load beam 30, and the hinge 36 may be made of any material having suitable mechanical properties for use in disk drive head suspensions. In one embodiment, one or more of these components are made from stainless steel. The hinge 36 may be attached to the load beam 30 and to the base mounting structure 16 by any suitable method providing sufficient strength. In various embodiments, these components may be attached together by welding, soldering, brazing, or other suitable processes.

As shown, the constraint layer portion 120 of the hinge 36 forms a portion of the damper 46, which also includes damping material 126 between and contacting the constraint layer portion 120 and the second side 88 of the load beam 30. In the illustrated embodiment, the damping material 126 has a shape generally matching the constraint layer portion 120 of the hinge 36, although this is not a requirement. In other embodiments, the damping material 126 may extend beyond the edges of the constraint layer portion 120, or alternatively, may have a smaller overall size than the constraint layer portion 120. Additionally, in other embodiments, the constraint layer portion 120 and the damping material 126 may have different shapes than that shown in FIGS. 2 and 3.

Figure 4:
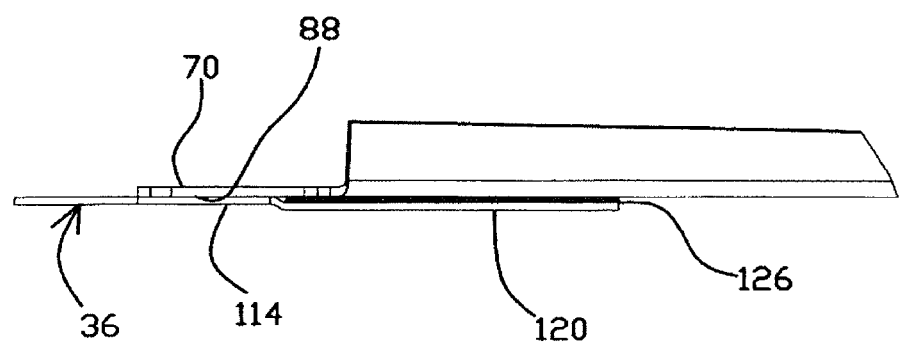
FIG. 4 is a side view of a portion of the head suspension of FIG. 1 taken along the line 4-4 in FIG. 3.

FIG. 4 is a side view of a portion of the assembled head suspension 10 taken along the line 4-4 in FIG. 3. As shown in FIG. 4, the load beam mounting portion 114 of the hinge 36 is attached directly to the second side 88 of the load beam 30 in the manner described above. Additionally, the constraint layer portion 120 of the hinge 36 overlays the damping material 126, which is thereby constrained between the second side 88 of the load beam 30 and the constraint layer portion 120 of the hinge 36 to form the damper 46. As further shown, in the illustrated embodiment, the load beam mounting portion 114 is oriented in one plane (which may be co-planar to the hinge arm 106 and the hinge proximal mounting portion 100, see FIG. 2), and the constraint layer portion 120 lies in a second plane offset from the plane of the load beam mounting portion 114. As will be appreciated, this offset accommodates the thickness of the damping material 126. In one embodiment, the constraint layer portion 120 is offset from the other portions of the hinge 36 in a separate fabrication step prior to mounting the hinge 36 to the load beam 30. In other embodiments, the hinge 36, including the constraint layer portion 120, is formed as a generally planar structure, and the constraint layer portion 120 is deformed as the hinge 36 is mounted to the load beam 30.

The damping material 126 may be a visco-elastic material selected based on the particular design criteria of the head suspension 10. In one embodiment, the damping material 126 is a pressure-sensitive adhesive material. In one exemplary embodiment, the damping material 126 is MP65 acrylic adhesive commercially available from John Deal Coatings, Inc. of Mt. Juliet, Tenn. ("JDC MP65"). Other exemplary materials for the damping material 126 include "SCOTCH" brand visco-elastic damping material available from 3M Company of St. Paul, Minn. Still other embodiments may utilize other damping materials 126 based on the particular requirements of the head suspension 10.

The damper 46 according to the various embodiments of the present invention has numerous advantages over conventional damping structures. According to the embodiments of the present invention, relative motion between the constraint layer portion 120 of the hinge 36 and the load beam 30 will load the damping material 126 in shear, resulting in vibration energy dissipation through the generation of low-grade frictional heat. This is in contrast to conventional damping approaches that rely on flexural or bending loading of the damping material and the constraint layer. Additionally, in various embodiments, the thicknesses of the load beam planar portion 80 and the hinge 36 may be substantially equal, resulting in an optimal damping condition in which the base layer (i.e., the load beam planar portion 80) and the constraining layer (i.e., the constraint layer portion 120 of the hinge 36) are of equal or nearly equal thickness. Furthermore, utilizing a portion of the hinge 36 as the constraint layer locates the damping material 126 at a location of relatively large strain on the load beam. The damper 46 of the embodiments of the present invention will reduce resonance vibration in first and second torsion modes as well as sway mode through shear loading of the damping layer 126 as compared to conventional damped head suspensions.

Additionally, use of a portion of the hinge 36 as the constraint layer 120 eliminates the need for the attachment of an additional structure to the head suspension 10, thereby reducing manufacturing steps as compared to conventional damped head suspensions. For example, the weld locations for attaching the load beam mounting portions 110, 114 to the weld beam 30 need not be modified to accommodate the additional constraint layer portion 120. Other advantages of the embodiments of the present invention will be apparent based on the foregoing.

To fabricate the head suspension 10, the load beam 30 and the hinge 36 can be formed using any suitable techniques. For example, the load beam 30 can be formed from a single sheet of stainless steel or other similar material using methods known in the art, e.g., etching. Similarly, the hinge 36 can also be formed from a single sheet of stainless steel by chemically etching blanks or sheets according to known methods. In one embodiment, the damping material 126 can be stamped from a sheet of dry film visco-elastic material such as described above, and mounted to the constraint layer portion 120 or the second side 88 of the load beam 30 using a pick-and-place technique. In another embodiment, the damping material 126 can be applied to the constraint layer portion 120 and/or the second side 88 of the load beam 30 using a modified roll-to-roll process.

As will be appreciated, dry film visco-elastic materials such as described above may include a release layer that can be removed prior to mounting the hinge 36 to the load beam 30. In other embodiments, the damping material 126 may be applied in a gel form to the constraint layer portion 120 or the second side 88 of the load beam 30. Where the aforementioned JDC MP65 is selected as the damping material 126, it may be applied at temperature of about 25 degrees Celsius. Additionally, depending on the particular material used, the damping material 126 may subsequently be cured as required to fully adhere the damping material 126 to the load beam 30 and to the constraint layer portion 120.

The hinge 36 can be attached to the base mounting structure 16 and the load beam 30 using any suitable technique, e.g., known welding, soldering, or brazing processes. Similarly, the flexure 44 can be assembled and attached to the load beam 30 using conventional methods. In some embodiments, a portion of the constraint layer portion 120 may be removed, e.g., by laser cutting, to accommodate mounting the flexure 44 to the load beam 30. The specific requirements of the head suspension 10 will dictate the particular manufacturing steps required.

Figure 6:
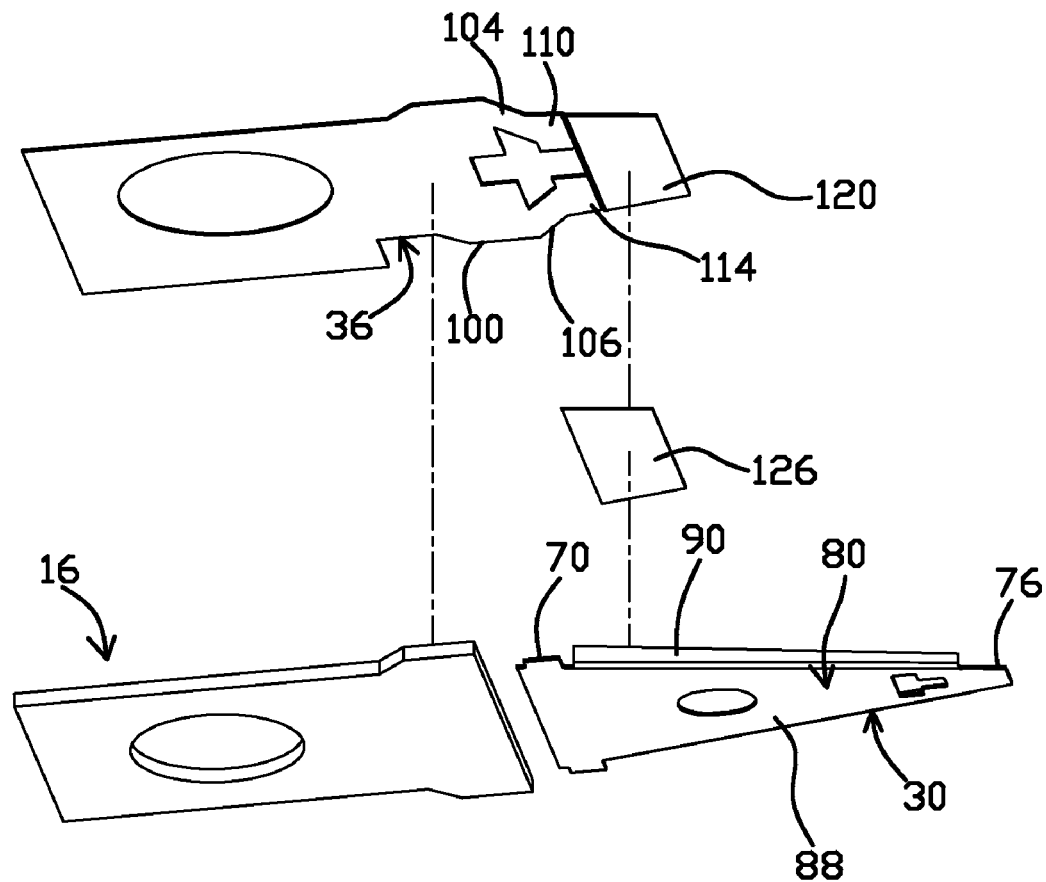
FIG. 6 is an exploded perspective view of an alternative embodiment of the head suspension of FIG. 1.

In the illustrated embodiment, the hinge 36 is mounted to the second side 88 of the load beam 30, i.e., the side of the load beam 30 opposite the edge rails 90, 94, although this is not a requirement. Rather, in other embodiments (e.g., as shown in FIG. 6), the hinge 36 can be mounted to the first side 84 of the load beam 30, thus locating the damper 46 between the edge rails 90, 94.

Figure 5:
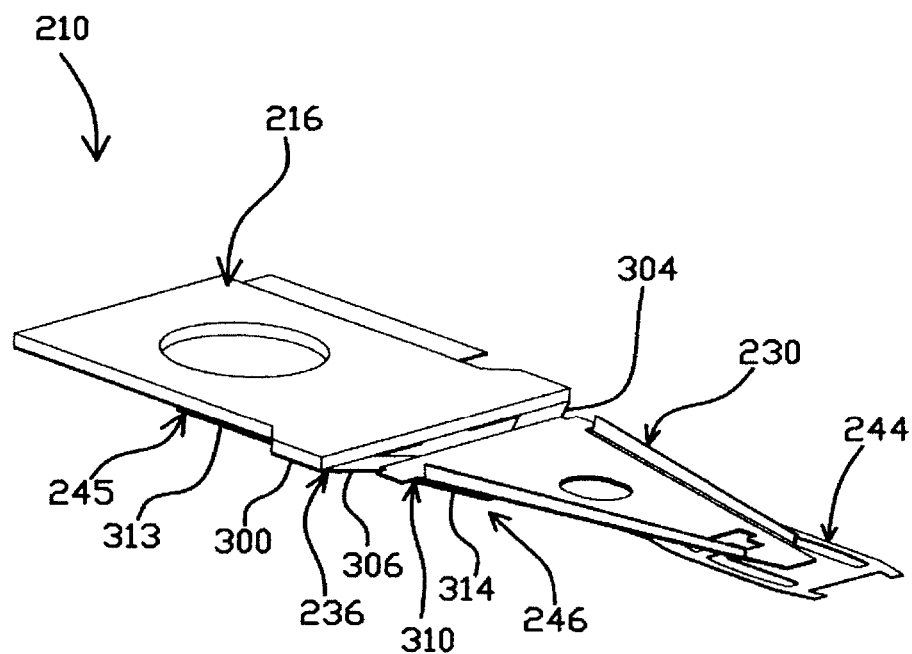
FIG. 5 is a perspective view of a disk drive head suspension according to an alternative embodiment of the present invention.

Additionally, in the illustrated embodiment, the head suspension 10 includes only a damper 46 on the load beam 30. It is contemplated, however, that in other embodiments, the head suspension 10 can include a damper 46 on the base mounting structure 16 in lieu of or in addition to the damper 46 on the load beam 30. For example, FIG. 5 is a perspective view of a head suspension 210 according to an alternative embodiment of the present invention. As shown, the head suspension 210 includes a base mounting structure 216, a load beam 230, a hinge 236, and a flexure 244, which except as described below, can be configured in substantially the same manner as the corresponding elements of the head suspension 10. As further shown, the head suspension 210 includes proximal and distal dampers 245, 246, on the base mounting structure 216 and the load beam 230, respectively. The hinge 236 includes a proximal mounting portion 300, a pair of hinge arms 304, 306, a distal load beam mounting portion 310, and proximal and distal constraint layer portions 313, 314 extending from the proximal and distal mounting portions 300, 310, respectively. As further shown, the proximal constraint layer portion 313 forms a portion of the proximal damper 245, and the distal constraint layer portion 314 forms a portion of the distal damper 245. As will be appreciated, damping material is located between the proximal constraint layer portion 313 and the base mounting structure 16, and also between the distal constraint layer portion 314 and the load beam 230. In one embodiment, the hinge 236 may be integrally formed with the load beam 230 from a single sheet of stainless steel or other suitable material. In one embodiment, the head suspension 210 includes only a single proximal damper 245 on the base mounting structure 216, and the distal damper 246 is omitted.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

We claim:

1. A disk drive head suspension comprising:
   a load beam including a proximal end portion and a distal end portion;
   a flexure attached to and supported by the load beam for carrying a magnetic head slider;
   a base mounting structure for coupling the head suspension to a disk drive actuation system;
   a hinge attached to the base mounting structure including a load beam mounting portion attached to the proximal end portion of the load beam and a constraint layer portion extending from the load beam mounting portion toward the distal end portion of the load beam, wherein the constraint layer portion is integral to the hinge, wherein the load beam is separated from the base mounting structure by a gap, and the hinge spans the gap to couple the load beam to the base mounting structure; and
   a damping material between and in contact with the constraint layer portion of the hinge and the load beam for damping resonance vibrations in the head suspension.

2. The head suspension of claim 1 wherein:
   the hinge further includes:
     a proximal mounting portion attached to the base mounting structure; and
     a pair of laterally-spaced hinge arms extending distally from the hinge proximal mounting portion each including a load beam mounting portion attached to the proximal end portion of the load beam; and
   the constraint layer portion extends distally from the load beam mounting portions.

3. The head suspension of claim 2 wherein:
the hinge proximal mounting portion, the hinge arms, and the load beam mounting portions are oriented in a first plane; and
the constraint layer portion of the hinge is oriented in a second plane offset from the first plane.

4. The head suspension of claim 1 wherein the damping material is a visco-elastic material.

5. The head suspension of claim 4 wherein the visco-elastic material is a pressure-sensitive adhesive material.

6. The head suspension of claim 4 wherein the visco-elastic material is an acrylic adhesive.

7. The head suspension of claim 6 wherein the load beam and the hinge are made from stainless steel.

8. The head suspension of claim 1 wherein:
the load beam includes a first side, a second side opposite the first side, and a pair of edge rails extending generally orthogonally to the first side;
the hinge is attached to the second side of the load beam; and
the damping material is between and in contact with the second side of the load beam and the constraint layer portion of the hinge.

9. The head suspension of claim 1 wherein:
the load beam includes a first side, a second side opposite the first side, and a pair of edge rails extending generally orthogonally to the first side;
the hinge is attached to the first side of the load beam; and
the damping material is between and in contact with the first side of the load beam and the constraining layer portion of the hinge.

10. The head suspension of claim 1 wherein:
the hinge further includes a second constraint layer portion; opposite the base mounting structure; and
further comprising a second damping material between the second constraint layer portion and the base mounting structure.

11. The head suspension of claim 1 wherein the base mounting structure is a base plate.

12. A disk drive head suspension comprising:
a load beam including a proximal end portion and a distal end portion;
a flexure attached to and supported by the load beam for carrying a magnetic head slider;
a base mounting structure for coupling the head suspension to a disk drive actuation system;
a hinge extending from the load beam and including:
a proximal mounting portion attached to the base mounting structure; and
a proximal constraint layer portion extending proximally from the proximal mounting portion, wherein the constraint layer portion is integral to the hinge, wherein the load beam is separated from the base mounting structure by a gap, and the hinge spans the gap to couple the load beam to the base mounting structure; and
a damping material between the constraint layer portion of the hinge and the base mounting structure and in contact with the constraint layer portion of the hinge and the base mounting structure for damping resonance vibrations in the head suspension.

13. The head suspension of claim 12 wherein the load beam and the hinge are a monolithic structure integrally formed from a single sheet of material.

14. The head suspension of claim 12 wherein the hinge includes a load beam mounting portion attached to the proximal end portion of the load beam.

15. The head suspension of claim 12 the hinge further includes:
a proximal mounting portion attached to the base mounting structure; and
a pair of laterally-spaced hinge arms extending distally from the hinge proximal mounting portion each including a load beam mounting portion attached to the load beam.

16. A disk drive head suspension comprising:
a load beam including a proximal end portion and a distal end portion;
a flexure attached to and supported by the load beam for carrying a magnetic head slider;
a base mounting structure for coupling the head suspension to a disk drive actuation system, the base mounting structure mechanically coupled to the load beam;
a damping material on at least the load beam or the base mounting structure; and
a hinge including a proximal mounting portion attached to the base mounting structure, a load beam mounting portion attached to the proximal end portion of the load beam, and a constraint layer portion overlaying and in contact with the damping material, wherein the constraint layer portion is integral to the hinge, wherein the load beam is separated from the base mounting structure by a gap, and the hinge spans the gap to couple the load beam to the base mounting structure.

17. The head suspension of claim 16 wherein:
the damping material is located on the load beam and the base mounting structure; and
the constraint layer portion of the hinge includes first and second constraint layer portions overlaying the damper material on the load beam and the hinge, respectively.

18. The head suspension of claim 16 wherein the damping material is on the base mounting structure.

19. The head suspension of claim 18 wherein the load beam and the hinge are a monolithic structure integrally formed from a single sheet of material.

20. The head suspension of claim 16 wherein the damping material is on the load beam.

* * * * *